United States Patent
Yamada et al.

(10) Patent No.: US 6,438,521 B1
(45) Date of Patent: Aug. 20, 2002

(54) SPEECH RECOGNITION METHOD AND APPARATUS AND COMPUTER-READABLE MEMORY

(75) Inventors: Masayuki Yamada; Yasuhiro Komori, both of Kawasaki; Kenichiro Nakagawa, Hino, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/396,863

(22) Filed: Sep. 15, 1999

(30) Foreign Application Priority Data

Sep. 17, 1998 (JP) .......................... 10-263552

(51) Int. Cl.[7] .......................... G10L 15/04; G10L 15/02
(52) U.S. Cl. .......................... 704/254; 704/252; 704/253
(58) Field of Search ................................ 704/231–245, 704/251–256

(56) References Cited

U.S. PATENT DOCUMENTS

| | | | |
|---|---|---|---|
| 3,646,576 A | * 2/1972 | Griggs | ....................... 704/231 |
| 5,170,432 A | 12/1992 | Hackbarth et al. | |
| 5,689,616 A | * 11/1997 | Li | ............................. 704/232 |
| 5,794,196 A | 8/1998 | Yegnanarayanan et al. | |
| 6,057,520 A | * 5/2000 | Lee | ........................... 704/270 |

FOREIGN PATENT DOCUMENTS

JP 2000-099070 * 4/2000 ........... G10L/11/06

OTHER PUBLICATIONS

☐ TextAssist™ ("User's Guide," Creative Labs © 1993).*
Communication for "European Search Report" dated Feb. 8, 2001.
Kellner et al., "With a Little Help From The Database–Developing Voice–Controlled Directory Information Systems", IEEE (1997).
Attwater et al., "Issues in large–vocabulary interactive speech systems", BT Technology Journal, vol. 14, (Jan. 1996).
IBM Technical Disclosure Bulletin, "Combined Multiple Acoustic Models to Retrieve Data", vol. 38, No. 11, (Nov. 1995).

* cited by examiner

*Primary Examiner*—Richemond Dorvil
*Assistant Examiner*—Daniel Nolan
(74) *Attorney, Agent, or Firm*—Morgan & Finnegan, L.L.P.

(57) ABSTRACT

A central processing unit determines whether speech separately uttered as a single syllable is included in input speech. On the basis of the determination result, an output unit is used to notify the user of information prompting the user to input speech again.

21 Claims, 7 Drawing Sheets

| i | RECOGNITION RESULT Ri | SCORE Si |
|---|---|---|
| 1 | KANAGAWA | 1032.4 |
| 2 | KAGAWA | 1013.8 |
| 3 | SAGA | 902.1 |

FIG. 5

SPEAK CONTINUOUSLY
WITHOUT ANY PAUSE

SPEECH RECOGNITION METHOD AND APPARATUS AND COMPUTER-READABLE MEMORY

BACKGROUND OF THE INVENTION

1. Field of the Invention

The present invention relates to a speech recognition method and apparatus for recognizing input speech, and a computer-readable memory.

2. Description of the Related Art

In a speech recognition technique, standard patterns (words or sentences) of standard input information are registered in some form in advance, and speech recognition is performed by comparing the registered standard patterns with an input utterance. Registration forms include, for example, forms using a phonemic expression and generative grammar. In speech recognition, scores representing the similarity between input speech and the standard patterns are determined, and a standard pattern exhibiting the highest score is determined as a speech recognition result.

As a method of inputting speech to be subjected to speech recognition, a method of inputting speech by separating an utterance into syllables of the speech is available. When, for example, "kanagawa" is to be input, the user separately utters the respective syllables, like "ka, na, ga, wa". This input method is called single syllable articulation.

In speech recognition for speech input by single syllable articulation, the following two methods have been used.

1. Speech recognition is performed for speech information obtained by removing periods regarded as silence periods from input speech.

2. Patterns input by single syllable articulation are also registered as patterns to be subjected to speech recognition, and speech recognition is performed, including speech recognition for each pattern.

Figure 7:
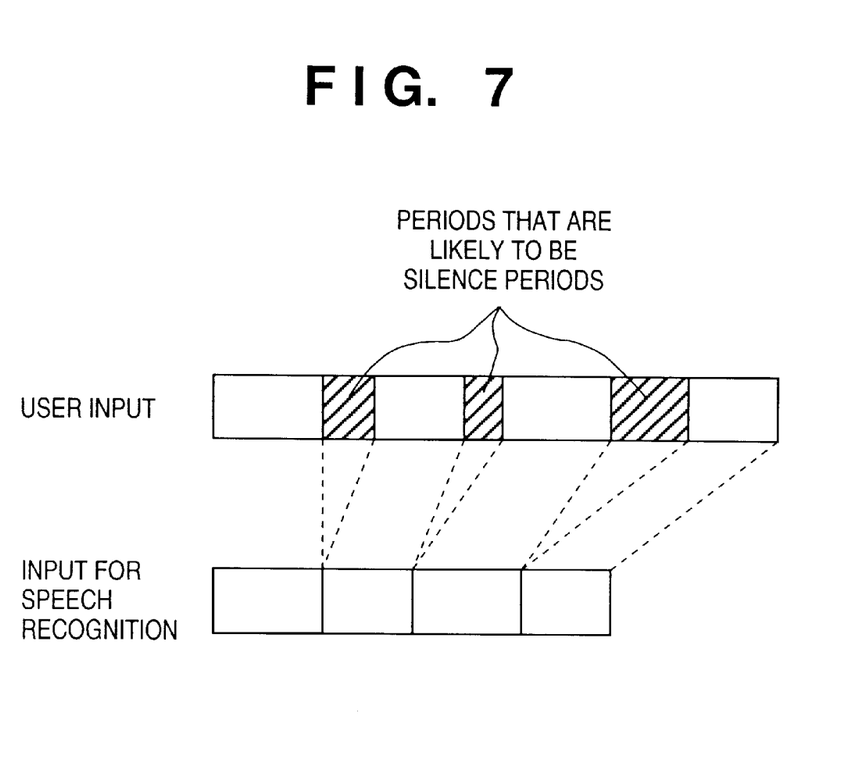
FIG. 7 is a view showing an example of a conventional speech recognition method.

According to method 1, periods regarded as silence periods are removed from input speech, and speech recognition is performed for the speech information obtained by connecting the remaining periods of speech (FIG. 7).

According to method 2, when the input speech is "kanagawa", not only the pattern "kanagawa" but also the pattern "ka (silence period) na (silence period) ga (silence period) wa" are registered as standard patterns. When the highest score is obtained between the input speech and the standard pattern registered as "ka (silence period) na (silence period) ga (silence period) wa", "kanagawa" is used as the speech recognition result.

The following problems are posed in the above speech recognition.

First, in method 1, erroneous determination of voiced/silence periods adversely affects the recognition result. To accurately determine whether given speech is silence, processing similar to speech recognition is required. In this case, problems similar to those posed in method 2 arise.

In method 2, two types of standard patterns, i.e., a pattern input by single syllable articulation and a pattern input by the other method, must be registered for each input speech. This leads to a large processing amount. In general, the recognition rate is often low in the environment at the beginning of a word (immediately after an silence period). In single syllable articulation, each syllable exists in the environment at the beginning of a word, and the reliability of the recognition result is low. There is another problem. In many cases, speech recognition is executed together with speech segmentation processing of automatically detecting the start and end points of an utterance. In single syllable articulation, the presence of an silence period between syllables tends to cause a speech segmentation error, i.e., erroneously recognizing an silence period inserted in a word as the end of an utterance. When such a speech segmentation error occurs, the probability of an accurate speech recognition result obtained by speech recognition for the speech segment is low.

SUMMARY OF THE INVENTION

The present invention has been made in consideration of the above problem, and has as its object to provide a speech recognition method and apparatus which can recognize speech with high efficiency and accuracy, and a computer-readable memory.

In order to achieve the above object, a speech recognition apparatus according to the present invention determines whether speech separately uttered as a single syllable is included in the input speech by comparing a first score calculated by comparing an arbitrary syllable sequence with the input speech and a second score calculated by a speech recognition result of the input speech and prompts the user to input speech again by speaking continuously without any pause on the basis of the determination result.

A speech recognition method is also presented according to the present invention where it is determined whether speech separately uttered as a single syllable is included in the input speech by comparing a first score calculated by comparing an arbitrary syllable sequence with the input speech and a second score calculated by a speech recognition result of the input speech and the user is prompted to input speech again by speaking continuously without any pause on the basis of the determination result.

In an alternative method of recognizing input speech, a speech input is received from a speaker and a first score of a single syllable sequence using a speech recognition algorithm and a second score of a speech recognition result for the input speech are calculated. The first and second scores are compared and the speech recognition result is output when the second score is larger than the first score.

In order to achieve the above object, a computer-readable memory according to the present invention includes a program code for recognizing input speech for configuring a system to determine whether speech separately uttered as a single syllable is included in the input speech by comparing a first score calculated by comparing an arbitrary syllable sequence with the input speech and a second score calculated by a speech recognition result of the input speech and prompt the user to input speech again by speaking continuously without any pause on the basis of the determination result.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

A preferred embodiment of the present invention will be described in detail below with reference to the accompanying drawings.

Figure 1:
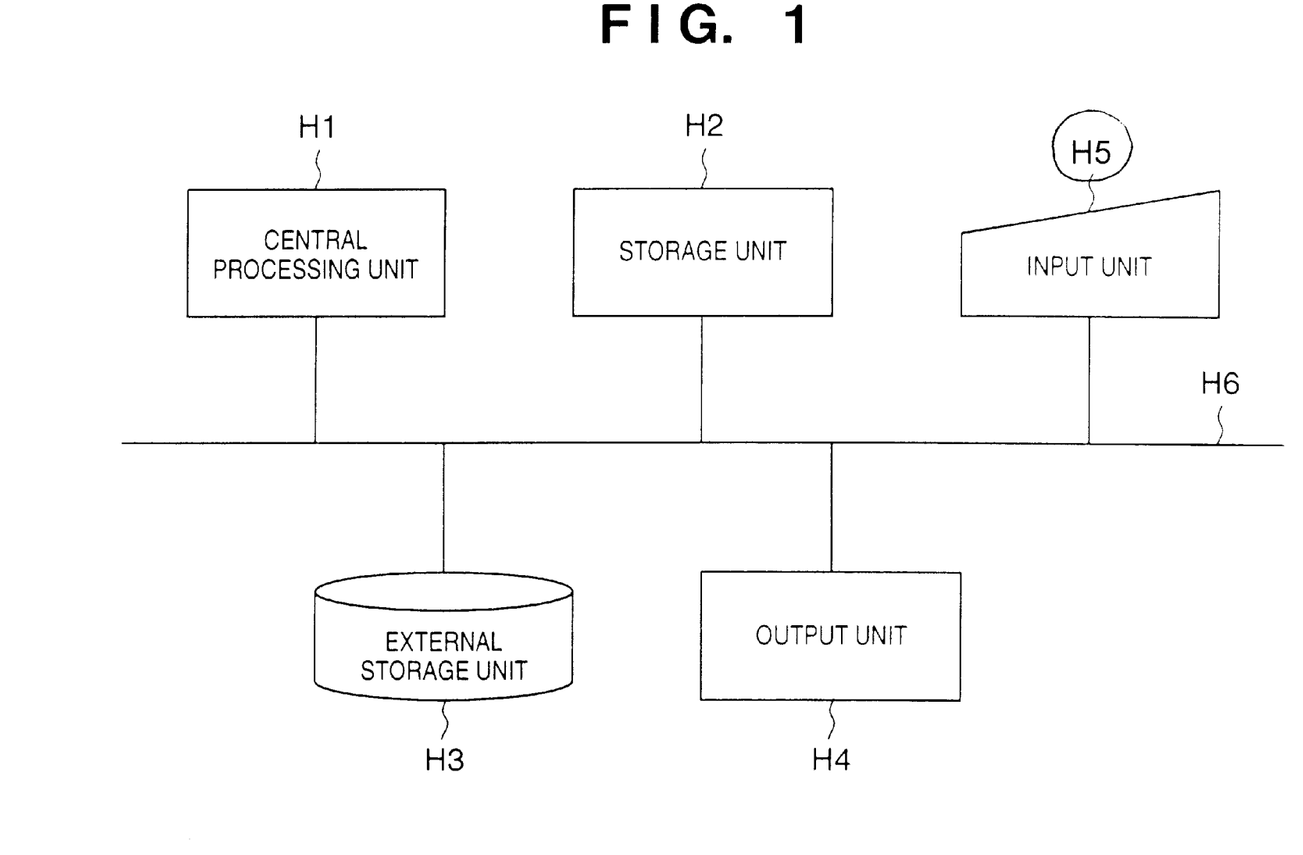
FIG. 1 is a block diagram showing the hardware arrangement of a speech recognition apparatus according to an embodiment of the present invention.

FIG. 1 shows the hardware arrangement of a speech recognition apparatus according to an embodiment of the present invention.

Reference symbol H1 denotes a central processing unit for performing arithmetic operation/control and the like. The central processing unit H1 computes in accordance with with the procedures executed in this embodiment. Reference symbol H2 denotes a storage unit such as a RAM, ROM, or the like in which the procedures executed in this embodiment and temporary data required for processing are stored; and H3, an external storage unit such as a hard disk unit in which, for example, standard patterns (templates) and phonemic models for speech recognition are stored.

Reference symbol H4 denotes an output unit such as a display which outputs a speech recognition result or information obtained by processing the speech recognition. In this embodiment, the output unit can be incorporated as part of another apparatus or program. In this case, the output is connected to the input of another apparatus or program. Reference symbol H5 denotes an input unit such as a microphone which inputs the speech uttered by the user.

In this embodiment, the input unit can be incorporated as part of another apparatus or program. In this case, the input operation is indirectly performed through another apparatus or program. Reference symbol H6 denotes a bus which connects the above units ranging from the central processing unit H1 to input unit H5 to each other.

The processing executed in this embodiment based on the above hardware arrangement will be described with reference to FIG. 2.

Figure 2:
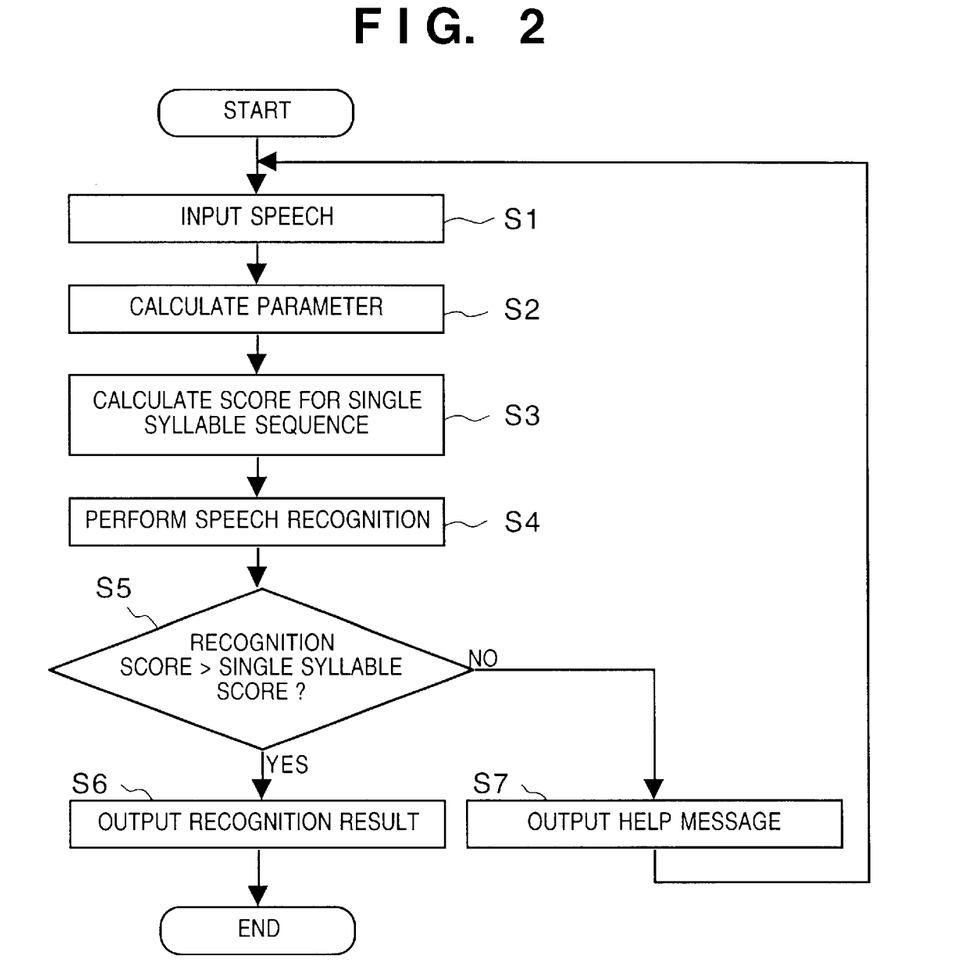
FIG. 2 is a flow chart showing the processing executed in this embodiment of the present invention.

FIG. 2 is a flow chart showing the processing executed in this embodiment of the present invention.

In step S1, the speech uttered by the user is input. In step S2, signal processing such as LPC analysis or cepstrum analysis is performed for the speech input in step S1 to calculate a parameter used to calculate the score in comparing a standard pattern with the input speech in speech recognition.

In step S3, a score s0 of the parameter calculated in step S2 for a single syllable sequence is calculated. In calculating the score for the syllable sequence, a speech recognition algorithm for comparing an arbitrary syllable sequence with the speech input as a recognition candidate is used, and the resultant score for the first candidate is set as a score for the syllable sequence. A method of expressing a recognition input when an arbitrary syllable sequence is an input to be recognized will be described with reference to FIG. 3.

Figure 3:
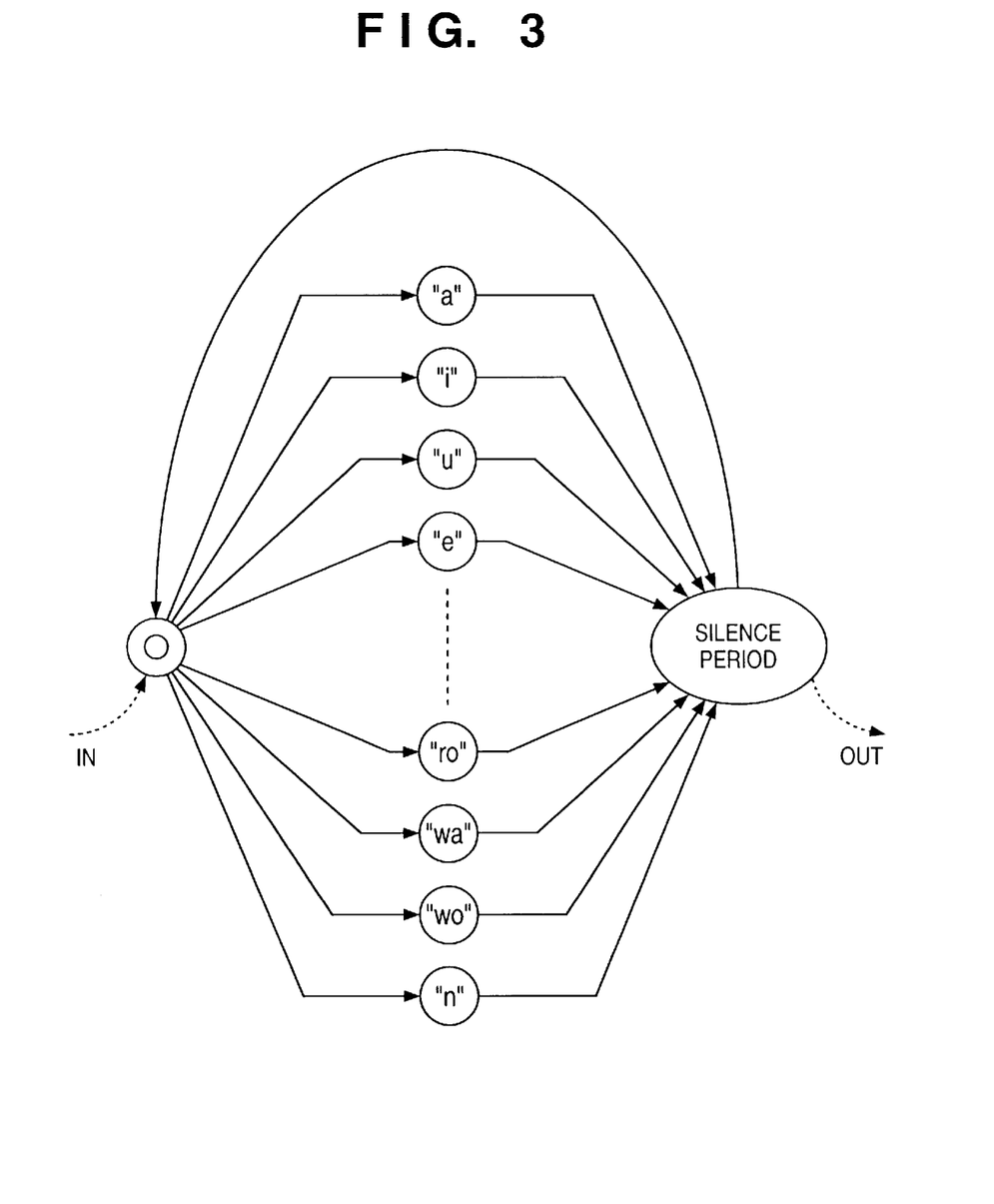
FIG. 3 is a view showing an example of a method of expressing a recognition target in this embodiment of the present invention.

FIG. 3 shows an example of a method of expressing a recognition input in this embodiment of the present invention.

Referring to FIG. 3, "a" to "n" accept utterances of the corresponding syllables, and "silence period" accepts silence periods each having a proper duration. A syllable chain formed by combining syllables and silence periods obtained by executing these accepting operations an arbitrary number of times is recognized. "⊙" indicates a NULL node set for the sake of illustrative convenience. A transition from this node to the next state is effected in the absence of any input.

Figure 4:
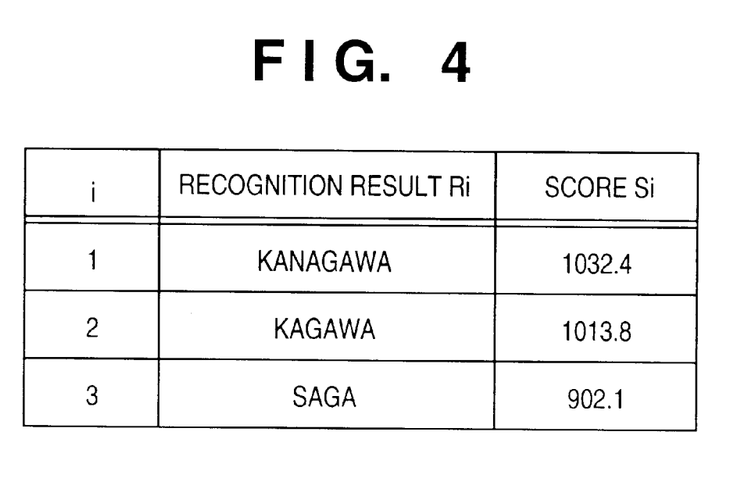
FIG. 4 is a view showing an example of a table of speech recognition results and scores in this embodiment of the present invention.

In step S4, speech recognition is performed by using the parameter calculated in step S2. As a result of the speech recognition, one or a plurality of recognition result character strings ri (i=1, 2, . . . ) and scores si of the respective recognition results are obtained. FIG. 4 shows an example of the corresponding table.

Figure 5:
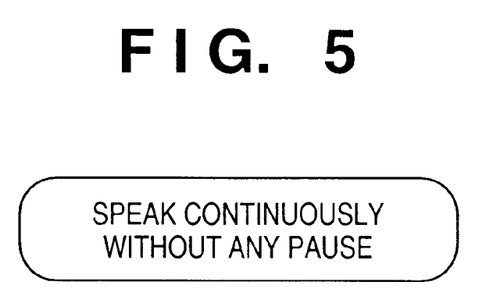
FIG. 5 is a view showing an example of a help message in this embodiment of the present invention.

In step S5, the score s0 calculated in step S3 is compared with a score s1 of the speech recognition result of the first candidate calculated in step S4. If the comparison result indicates that s1 (recognition score)>s0 (syllable score) (the larger the score, the higher the likelihood of the recognition result) (YES in step S5), the flow advances to step S6 to output the speech recognition result obtained in step S4. The processing is then terminated. If the comparison result does not indicate that s1 (recognition score)>s0 (syllable score) (NO in step S5), the flow advances to step S7 to output, to the output unit H4, a message notifying the user of the detection of single syllable articulation or message prompting the user to continuously utter speech as shown in FIG. 5. The flow then returns to step S1.

As described above, according to this embodiment, single syllable articulation by the user can be properly handled without increasing the calculation amount much. In addition, since only information indicating whether single syllable articulation is in progress or not is used, speech recognition does not depend on the recognition result of the contents of single syllable articulation (the speech recognition result indicating the utterance of a specific single syllable sequence). Therefore, speech recognition is not influenced by the speech recognition rate of each syllable. Even if single syllable articulation is interrupted when the speech segmentation unit erroneously detects the end of the utterance, speech recognition can be properly performed. An input by single syllable articulation as a final input for speech recognition can be omitted, and hence a high recognition rate can be ensured.

In the above embodiment, steps S3 and S4 have been described as explicitly separate steps. However, steps S3 and S4 can be executed in one step.

Figure 6:
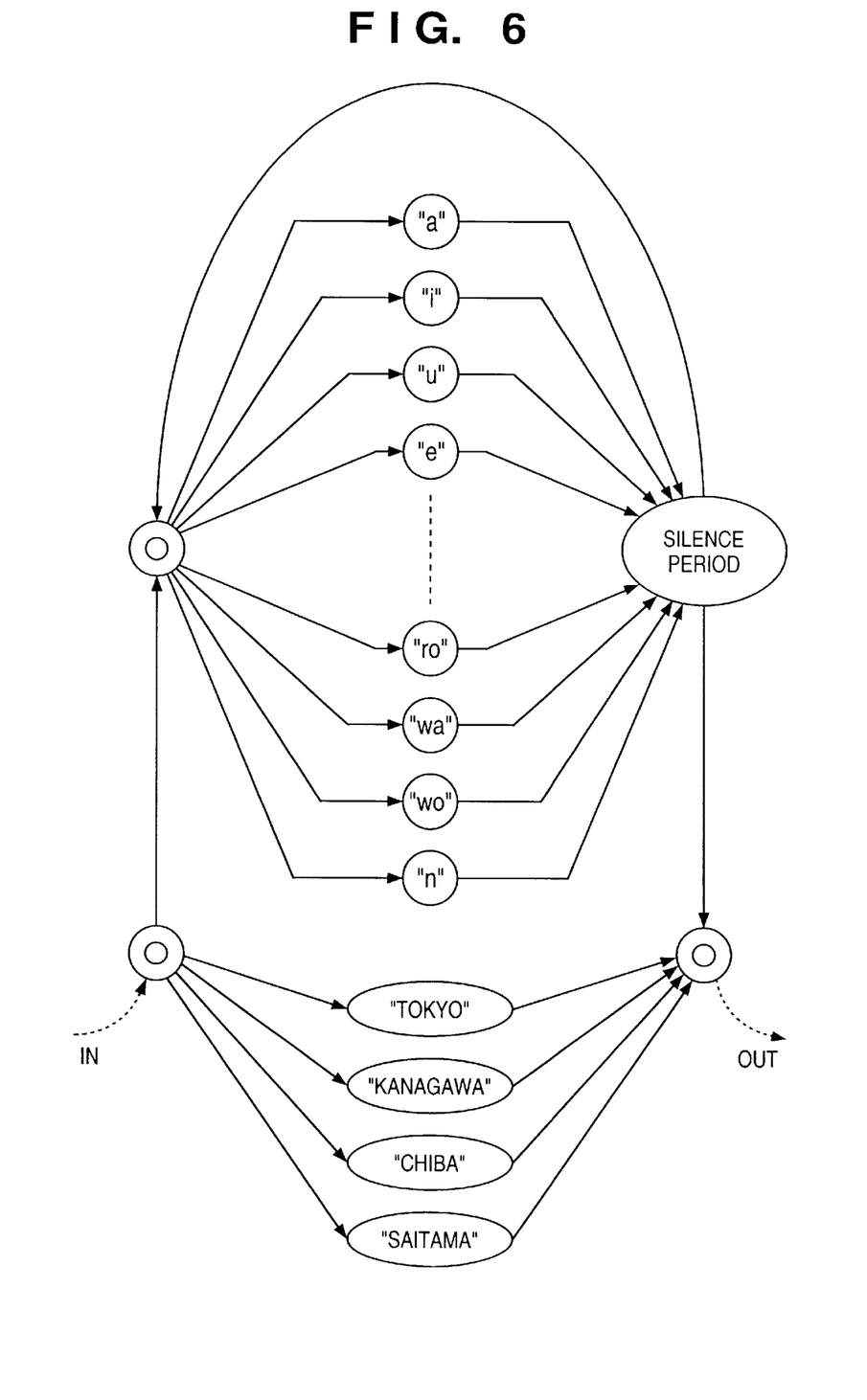
FIG. 6 is a view showing another speech recognition method in this embodiment of the present invention.

Assume that the recognition method shown in FIG. 6 is used, and the speech recognition result of the first candidate is a single syllable sequence. In this case, by regarding the speech input by the user as a single syllable sequence, processing equivalent to that in the above embodiment can be performed. In this case, steps S3 and S5 are included in step S4.

In the above embodiment, a score for a single syllable sequence is calculated by using a single syllable chain formed by combining arbitrary syllables and silence periods. However, this calculation may be performed by using only a single syllable sequence expected to be uttered by the user. For example, only a combination of two syllable chains included in a recognition input word may be used.

In addition, a penalty may be imposed on the score s0 for a single syllable sequence, and the resultant score may be compared with the score s1 of the speech recognition result. When, for example, a score which is an integer is used, αs0 and s1 may be compared with each other by using a multiplier α (0<α<1). Alternatively, β (β>0) may be used to compare s0-β and s1.

In step S7, a help message is displayed on the output unit H4 to prompt the user to input speech again. However, a speech output unit may be used as the output unit H4 to output a help message by speech so as to prompt the user to input speech again.

Note that the present invention may be applied to either a system constituted by a plurality of devices (e.g., a host computer, an interface device, a reader, a printer, and the like), or an apparatus consisting of a single device (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. A speech recognition apparatus for recognizing input speech, comprising:
    determination means for determining whether speech separately uttered as a single syllable is included in the input speech by comparing a first score calculated by comparing an arbitrary syllable sequence with the input speech and a second score calculated by a speech recognition result of the input speech; and
    prompting means for prompting the user to input speech again by speaking continuously without any pause on the basis of the determination result obtained by said determination means.

2. The apparatus according to claim 1, wherein said determination means comprises:
    calculation means for calculating said first score for a single syllable sequence of the input speech; and
    recognition means for performing speech recognition for the input speech and calculating said second score for the speech recognition result.

3. The apparatus according to claim 2, wherein said determination means compares the second score with a score obtained by multiplying the first score by a predetermined number, and determines on the basis of the comparison result whether speech separately uttered as a single syllable is included in the input speech.

4. The apparatus according to claim 2, wherein said determination means compares the second score with a score obtained by subtracting a predetermined number from the first score, and determines on the basis of the comparison result whether speech separately uttered as a single syllable is included in the input speech.

5. The apparatus according to claim 2, wherein said calculation means calculates the first score for a single syllable sequence of the input speech by using a single syllable chain obtained by combining an arbitrary number of pairs of arbitrary single syllables and silence periods.

6. The apparatus according to claim 2, wherein said calculation means calculates the first score for a single syllable sequence of the input speech by using two syllable chains sandwiching a silence period.

7. The apparatus according to claim 1, wherein said notification means notify information to input speech again on a display unit.

8. The apparatus according to claim 1, wherein said notification means notifies information to input speech again by speech.

9. A speech recognition method of recognizing input speech, comprising:
    a determination step of determining whether speech separately uttered as a single syllable is included in the input speech by comparing a first score calculated by comparing an arbitrary syllable sequence with the input speech and a second score calculated by a speech recognition result of the input speech; and
    a prompting step of prompting the user to input speech again by speaking continuously without any pause on the basis of the determination result obtained in the determination step.

10. The method according to claim 9, wherein the determination step comprises:
    a calculation step of calculating said first score for a single syllable sequence of the input speech; and
    a recognition step of performing speech recognition for the input speech and calculating said second score for the speech recognition result.

11. The method according to claim 10, wherein the determination step comprises comparing the second score with a score obtained by multiplying the first score by a predetermined number, and determining on the basis of the comparison result whether speech separately uttered as a single syllable is included in the input speech.

12. The method according to claim 10, wherein the determination step comprises comparing the second score with a score obtained by subtracting a predetermined number from the first score, and determining on the basis of the comparison result whether speech separately uttered as a single syllable is included in the input speech.

13. The method according to claim 10, wherein the calculation step comprises calculating the first score for a single syllable sequence of the input speech by using a single syllable chain obtained by combining an arbitrary number of pairs of arbitrary single syllables and silence periods.

14. The method according to claim 10, wherein the calculation step comprises calculating the first score for a single syllable sequence of the input speech by using two syllable chains sandwiching a silence period.

15. The method according to claim 9, wherein the notification step comprises notifying information to input speech again using a display unit.

16. The method according to claim 9, wherein the notification step comprises notifying information to input speech again by speech.

17. A computer-readable memory in which a program code for recognizing input speech is stored, comprising:

a program code for a determination step of determining whether speech separately uttered as a single syllable is included in the input speech by comparing a first score calculated by comparing an arbitrary syllable sequence with the input speech and a second score for a speech recognition result of the input speech; and a program code for a prompting step of prompting the user to input speech again by speaking continuously without any pause on the basis of the determination result obtained in the determination step.

18. A speech recognition method of recognizing input speech, comprising:

receiving speech input from a speaker;

calculating a first score of a single syllable sequence using a speech recognition algorithm which compares an arbitrary syllable sequence with the input speech;

calculating a second score of a speech recognition result for the input speech;

comparing the first and second scores; and outputting the speech recognition result when the second score is larger than the first score.

19. The speech recognition method according to claim 18, wherein the outputting step further comprising prompting the user to input speech again by speaking continuously without any pause when the first score is larger than the second score.

20. A speech recognition apparatus for recognizing input speech, comprising:

means for receiving speech input from a speaker;

means for calculating a first score of a single syllable sequence using a speech recognition algorithm which compares an arbitrary syllable sequence with the input speech;

means for calculating a second score of a speech recognition result for the input speech;

means for comparing the first and second scores; and means for outputting the speech recognition result when the second score is larger than the first score.

21. A computer readable storage medium comprising a program stored thereon for executing the speech recognition method according to claim 18.

* * * * *